United States Patent
Starinshak et al.

[11] Patent Number: 5,279,695
[45] Date of Patent: Jan. 18, 1994

[54] PROCESS FOR MANUFACTURING A CABLE FOR REINFORCING RUBBER ARTICLES

[75] Inventors: Thomas W. Starinshak, Wadsworth; Robert M. Shemenski, North Canton; John W. Price, Jr., Uniontown; Robert J. Gartland, Youngstown, all of Ohio

[73] Assignee: The Goodyear Tire & Rubber Company, Akron, Ohio

[21] Appl. No.: 914,127

[22] Filed: Jul. 17, 1992

Related U.S. Application Data

[62] Division of Ser. No. 697,843, May 9, 1991, Pat. No. 5,139,874.

[51] Int. Cl.$^5$ ............................................. B29C 65/02
[52] U.S. Cl. ................................ 156/296; 152/451; 156/309.6
[58] Field of Search ...................... 156/296, 309.6; 152/451, 527, 540, 556; 526/93; 264/171, 174, 210.8; 57/902, 220, 225, 241, 242, 295, 297

[56] References Cited

U.S. PATENT DOCUMENTS

| | | | |
|---|---|---|---|
| 2,224,274 | 12/1940 | Powers | 152/451 |
| 2,500,523 | 3/1950 | Crosby et al. | 57/297 |
| 3,486,546 | 12/1969 | Sidles et al. | 57/225 |
| 3,686,855 | 8/1972 | Falcy et al. | 57/220 |
| 3,901,868 | 8/1975 | Ueno et al. | 526/93 |
| 3,977,174 | 8/1976 | Boileau | 57/145 |
| 4,176,705 | 12/1979 | Russell et al. | 152/451 |
| 4,215,021 | 7/1980 | Ogawa et al. | 264/171 |
| 4,264,670 | 4/1981 | Kontos | 264/DIG. 8 |
| 4,446,198 | 5/1984 | Shemenski et al. | 428/625 |
| 4,452,291 | 6/1984 | Shemenski et al. | 152/359 |
| 4,487,010 | 12/1984 | Chiappetta et al. | 57/213 |
| 4,588,546 | 5/1986 | Feil et al. | 264/510 |
| 4,902,741 | 2/1990 | Burroway et al. | 524/836 |

FOREIGN PATENT DOCUMENTS

| | | | |
|---|---|---|---|
| 0382273 | 8/1990 | European Pat. Off. | |
| 2263951 | 7/1974 | Fed. Rep. of Germany | 152/451 |
| 1413465 | 8/1965 | France | |
| 37679 | 11/1971 | Japan | 264/210.8 |
| 151052 | 11/1980 | Japan | |
| 8402819 | 11/1985 | Netherlands | 28/100 |
| 1014782 | 12/1965 | United Kingdom | |
| 1074302 | 7/1967 | United Kingdom | 264/210.8 |
| 1205281 | 9/1970 | United Kingdom | 152/451 |

OTHER PUBLICATIONS

"Solventless Fabrication of Reinforced Composites", NASA Tech. Briefs, Fall 1982.

*Primary Examiner*—Geoffrey L. Knable
*Assistant Examiner*—Steven D. Maki
*Attorney, Agent, or Firm*—Alvin T. Rockhill

[57] ABSTRACT

Steel cables are utilized for reinforcing a wide variety of rubber articles. For instance, pneumatic tires are normally reinforced with steel tire cords. It is important for such reinforcing cables to exhibit good fatigue and corrosion resistance. It has been unexpectedly found that the fatigue and corrosion resistance of such cables can be improved by incorporating syndiotactic-1,2-polybutadiene into the interstices between the steel filaments in such cables. This invention more specifically relates to a cable for reinforcing rubber articles having improved fatigue and corrosion resistance which is comprised of a plurality of steel filaments and syndiotactic-1,2-polybutadiene, wherein the syndiotactic-1,2-polybutadiene is dispersed within interstices between said steel filaments.

3 Claims, 1 Drawing Sheet

PROCESS FOR MANUFACTURING A CABLE FOR REINFORCING RUBBER ARTICLES

This is a divisional of application Ser. No. 07/697,843, filed on May 9, 1991, now U.S. Pat. No. 5,139,874.

BACKGROUND OF THE INVENTION

It is frequently desirable to reinforce rubber articles, for example, tires, conveyor belts, power transmission belts, timing belts, hoses, and the like products, by incorporating therein steel cables. Pneumatic vehicle tires are often reinforced with cords prepared from brass coated steel filaments. Such tire cords are frequently composed of high carbon steel or high carbon steel coated with a thin layer of brass. Such a tire cord can be a monofilament, but normally is prepared from several filaments which are stranded together. In most instances, depending upon the type of tire being reinforced, the strands of filaments are further cabled to form the tire cord.

In order for rubber articles which are reinforced with steel wire elements to function effectively it is imperative that good adhesion between the rubber and the steel cord be maintained. Thus, generally steel wire reinforcement elements are coated with brass in order to facilitate rubber-metal adhesion.

It is generally agreed by those skilled in the art that adhesion of rubber to brass-plated steel wire is dependent upon a bond between the copper in the brass and sulfur in the rubber. When such brass coated steel reinforcing elements are present in the rubber composition during vulcanization, it is believed that bonds between the rubber and steel reinforcement form due to a chemical reaction between the brass alloy and the rubber at the interface forming a bonding interphase. The brass coating also serves an important function as a lubricant during final wet drawing of steel filaments.

Cables for reinforcing rubber articles which are comprised of predominantly alpha-brass coated filaments typically provide adequate original metal to rubber adhesion after being cured. However, the level of rubber to metal adhesion displayed diminishes with the passage of time. The presence of salt and humidity are known to have an adverse effect on rubber to metal adhesion. Tires as well as other reinforced rubber articles are often subjected to a long service life under conditions where salt and humidity are present in their operating environment. For this reason, it would be desirable to improve the aged rubber to metal adhesion, fatigue resistance and corrosion resistance of cables for reinforcing rubber articles.

SUMMARY OF THE INVENTION

This invention is based upon the unexpected finding that syndiotactic-1,2-polybutadiene can be utilized to improve the aged rubber to metal adhesion, fatigue resistance and corrosion resistance of cables used in reinforcing rubber articles. By utilizing the technique of this invention, tire cords having improved fatigue and corrosion resistance can be manufactured. An additional feature of incorporating syndiotactic-1,2-polybutadiene in cables is the prevention of filament migration from the cable during service under conditions of mechanical action. This allows for the use of simple closed cable constructions. It also reduces the need for utilizing core filaments having a larger diameter than the outer filaments.

In practicing this invention, syndiotactic-1,2-polybutadiene is dispersed within the interstices between the steel filaments in the cable. Syndiotactic-1,2-polybutadiene has a unique combination of properties which allows it to be employed in this application. These properties include its ability to cocure with and bond to rubber, its compatibility with typical rubbers, its ability to be crosslinked with conventional curatives, and its ability to be melted and processed like other thermoplastics.

The subject invention specifically discloses a cable for reinforcing rubber articles having improved fatigue and corrosion resistance which is comprised of a plurality of steel filaments and syndiotactic-1,2-polybutadiene, wherein the syndiotactic-1,2-polybutadiene is dispersed within interstices between said steel filaments.

Numerous benefits are realized by practicing this invention. These benefits include reduced inner filament surface damage caused by fretting, improved corrosion resistance, reduced filament migration from the cable which allows for the use of simpler constructions, and reduced cable flair.

DETAILED DESCRIPTION OF THE INVENTION

Figure 1:
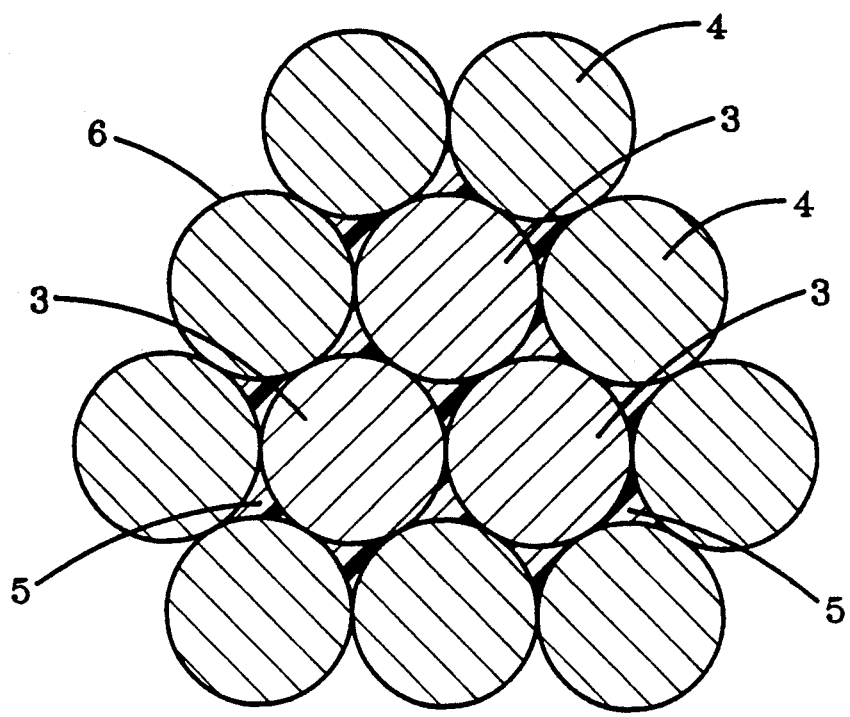
FIG. 1 is a cross-sectional view of a cable for reinforcing rubber articles which is comprised of three core filaments and nine outer filaments without a spiral wrap wherein syndiotactic-1,2-polybutadiene is dispersed within the interstices between said filaments after being heat treated.

The term "steel" as used in the present specification and claims refers to what is commonly known as carbon steel, which is also called high-carbon steel, ordinary steel, straight carbon steel, and plain carbon steel. An example of such a steel is American Iron and Steel Institute Grade 1070-high carbon steel (AISI 1070). Such steel owes its properties chiefly to the presence of carbon without substantial amounts of other alloying elements. U.S. Pat. No. 4,960,473 discloses some preferred steel alloys and an excellent process for manufacturing steel filaments which can be utilized in this invention.

Brass is an alloy of copper and zinc which can contain other metals in varying lesser amounts. Alpha-brass which contains from about 63% to about 99% copper and from about 1% to about 37% zinc is generally used in coating filaments for utilization in manufacturing cables for reinforcing rubber articles. It is normally preferred for the brass to contain from about 62% to about 75% by weight copper and from about 38% to about 25% by weight zinc. Iron-brass alloys which contain 0.1 to 10 percent iron can also be employed. U.S. Pat. No. 4,446,198 discloses such iron-brass alloys and the benefits associated with using them to reinforce rubber articles, such as tires. It should be noted that this invention can also be used in conjunction with filaments having other types of coatings. For example, it can be employed in conjunction with zinc coated filaments, such as those typically used in conveyor belts.

The syndiotactic 1,2-polybutadiene used in the practice of the subject invention normally has more than 65% of its repeat units which are derived from 1,3-butadiene in a syndiotactic 1,2-configuration. SPBD can be prepared in an inert organic solvent utilizing the technique described in U.S. Pat. No. 3,901,868, in an aqueous medium utilizing the process described in U.S. Pat. No. 4,506,031, or by emulsion polymerization utilizing the process disclosed in U.S. Pat. No. 4,902,741. U.S. Pat. No. 4,506,031 more specifically reveals a process for producing polybutadiene composed essentially of SPBD comprising the steps of:

(A) preparing a catalyst component solution by dissolving, in an inert organic solvent containing 1,3-butadiene, (a) at least one cobalt compound selected from the group consisting of (i) $\beta$-diketone complexes of cobalt, (ii) $\beta$-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones, and N,N-dialkylamides, and (b) at least one organoaluminum compound of the formula $AlR_3$, wherein R represents a hydrocarbon radical of 1 to 6 carbon atoms;

(B) preparing a reaction mixture by mixing said catalyst component solution with a 1,3-butadiene/water mixture containing desired amounts of said 1,3-butadiene;

(C) preparing a polymerization mixture by mixing carbon disulfide throughout said reaction mixture, and (D) polymerizing said 1,3-butadiene in said polymerization mixture into polybutadiene while agitating said polymerization mixture. In the process described therein the crystallinity and melting point of the SPBD can be controlled by adding alcohols, ketones, nitriles, aldehydes or amides to the polymerization mixture.

The SPBD utilized in making the cables of this invention normally has a melting point which is within the range of about 70° C. to about 200° C. It is generally preferred for the SPBD to have a melting point which is within the range of about 80° C. to about 160° C. with a melting point which is within the range of 90° C. to 125° C. being most preferred. The melting points referred to herein are the minimum endotherm values determined from DSC (differential scanning calorimetry) curves.

The cables of this invention are comprised of at least three steel filaments. The interstices between said steel filaments contain SPBD. The techniques of this invention can be utilized to improve the characteristics of virtually any type of cable construction.

FIG. 1 illustrates a 12× cable construction which contains three core filaments 3 and nine outer filaments 4. The interstices 5 between these filaments contains SPBD which has been dispersed after melting. It is not essential for the SPBD to occupy the entire volume of the interstices between the steel filaments. In fact, the benefits of this invention can be realized without the SPBD occupying the total volume of the interstices between the steel filaments. However, it is important for the SPBD to be maintained within the interstices between said steel filaments and not to protrude out of the interstices between the steel filaments so as to cover the outer surface of the cable. This is because there is better adhesion between rubber and brass coated steel than there is between the brass coated steel and SPBD. Thus, rubber to metal adhesion is lost in cases where the SPBD covers the outer surface 6 of the cable. Accordingly, the SPBD will not cover a significant amount of the outer surface of the cable.

FIG. 1 illustrates a relatively simple cable construction with contains twelve filaments. However, improved rubber to metal adhesion, fatigue resistance and corrosion resistance can be realized by incorporating SPBD into the interstices of much more complex cable constructions. For instance, SPBD can be incorporated into the interstices between the steel filaments in cables containing hundreds of filaments such as those utilized in earthmover tires.

There are many ways for incorporating the SPBD into the interstices between the steel filaments of a cable. One such technique involves extruding SPBD onto the core or one or more core filaments being utilized in the cable construction. In doing this, it is convenient to utilize an extruder equipped with a pressure type crosshead die or a tubing type cross-head die. Such an extruder which is equipped with a tubing type cross-head die and the operation thereof is described in U.S. Pat. No. 4,588,546, the teachings of which are incorporated herein by reference.

The core filaments which are coated with SPBD can then be utilized in constructing the cable. Such SPBD coated filaments can be employed as the core filaments of the cable using standard cabling procedures.

It is preferred for the SPBD to have a melting point which is lower than the temperature at which the rubber article will be cured (vulcanized). In such cases, the SPBD will melt during the vulcanization of the rubber article and disperse throughout the interstices between the steel filaments in the cable used for reinforcement. It is also important for the SPBD to have a melting point which is above the highest service temperature which the rubber article will experience. For this reason, it is most preferred for SPBD utilized in tire cords to have a melting point which is within the range of about 90° C. to about 125° C.

In cases where the SPBD has a higher melting point than the vulcanization temperature, the cable will need to be heated before it is incorporated into the rubber article in a separate heating step. Such a heating step is needed to melt the SPBD so as to disperse it throughout the interstices between the steel filaments in the cable. Electrical induction heating can be utilized in cases where a separate heating step is required.

In an alternative embodiment of this invention, cables are constructed by cabling a SPBD monofilament into the core area of the cable construction. Such cables are prepared empolying standard bunching and stranding procedures with one or more SPBD monofilaments being incorporated into the core of the cable.

The production of monofilament from polymer generally requires two steps. First, the SPBD is melt extruded producing a filament which is cooled in transit and taken up in a solid form. This process is known as melt spinning. The filament is then subjected to a second operation in which it is unwound from a slow roll, stretched (drawn) under controlled conditions and taken up on a fast roll. This second process is known as drawing.

In the molten condition, SPBD was cooled at room temperature and oriented upon cold-drawing to yield a product having excellent physical properties. It is desirable in the quenching of the monofilament upon extrusion not to use water since it is a source of contamination when used in wire applications. Conventional nonisothermal spinning of the SPBD is carried out with cooling being free convection.

It is characteristic of SPBD that a certain degree of polymer crystallizes quite rapidly. Therefore, the monofilament morphology is somewhat fixed in the spinning process and limits the range of properties obtainable in the subsequent drawing stage. In addition, drawing is performed at lower rates as compared to processing completely amorphous extruded filaments.

In the drawing process, the extruded SPBD monofilament is generally pulled by a first set of small diameter pulley rolls located on a Capstan/Winder. The pulley assembly is normally built of heavy construction and is supported as a cantilever from one end. This allows an operator during start-up to string the filament over the ends and around each element. The pulleys are typically designed with a V groove for gripping and holding the strand without sliding around the rolls due to tension. They can be driven by a variable speed drive motor with a digital feed-back controller.

The strand is then normally passed from the small diameter pulley to a larger diameter pulley mounted on the same sets of rotating shaft. Like the first pair of pulleys, they develop a firm hold on the filament utilizing the V groove and produce a very steady pull proportional to the pulley's diameters. This difference in pulley size reflects in a proportional surface speed increase which results in stretching the strands between the small sets of pulleys and large sets of pulleys. Different draw ratios can be achieved by using different diameter pulleys sizes.

High forces can develop during stretching of the partially crystalline SPBD extrudate and pulleys with V-grooves before and after the transition zone grips the strand securely. The stretching process is called orientating or drawing.

Following orientation the filament is allowed to relax by about five percent (5%) by passing the strand to the slightly smaller diameter groove on the largest pulleys. Here the valley of the groove is flat so as not to grip the strand and permit somewhat further relaxation and a period of process time to improve dimensional uniformity prior to wind-up. The monofilament is then normally wound-up utilizing a traversing mechanism to distribute the filament on an appropriate spool for subsequent processing in the wire cabling procedure.

The SPBD monofilament utilized in such a cabling procedure must have high strength which allows for easier processing through the wire cabling equipment and reduces the possibility of the monofilament breaking. This can be achieved by extruding the SPBD into a monofilament and immediately drawing it to a draw ratio of at least about 3:1. This drawing procedure is normally carried out at a temperature which is within the range of about 10° C. to about 50° C., preferably at room temperature as soon as possible after the SPBD monofilament exits the extruder to limit the extent of crystallization which occurs before drawing. It is preferred for the SPBD monofilament to be drawn to a draw ratio of about 4:1 to about 8:1. It is most preferred for the SPBD monofilament to be drawn to a draw ratio which is within the range of about 5:1 to about 7:1. This drawing rearranges the polymer chains in the SPBD to increase strength in the direction of pull. This increased level of orientation increases the strength of the monofilaments. However, wide-angle x-ray scattering (WAXS) and DSC analysis indicate that the drawing procedure does not increase the total level of crystallinity in the SPBD monofilaments.

In cases where SPBD monofilament is cabled into the core of the cord construction, it is still necessary to melt the SPBD monofilament to disperse it throughout the interstices between the steel filaments. This can be done during the curing of the rubber article in which it is incorporated or through a separate heat treatment step. When the composite is subjected to a heat treatment step, the SPBD melts and flows to fill void volume within interstices between the filaments in the wire bundle and maintains continuity throughout the length of the wire cord without breaking.

It has been found that the SPBD can be blended with one or more rubbers prior to being incorporated into the cable construction. Various polydiene rubbers such as cis-1,4-polybutadiene, polyisoprene, styrene-butadiene rubber, nitrile rubber, styrene-isoprene-butadiene rubber, and isoprene-butadiene rubber, can be utilized in such applications. Typically the rubber will not constitute more than about 50 weight percent of the SPBD/rubber blend. Various rubber chemicals, such as curatives, accelerators and antidegradants, can also be included in such blends. For instance, such blends can contain sulfur and other rubber chemicals, such as antioxidants, accelerators, oils, and waxes in conventional amounts. For instance, such SPBD/rubber blends will typically contain from about 0.2 to about 8 phr of sulfur. It is generally preferred for such blends to contain from about 0.5 to 4 phr of sulfur with it being most preferred for such blends to contain from 1 to 2.5 phr of sulfur. A primary accelerator is generally also present in such blends at a concentration which is within the range of about 0.1 to about 2.5 phr. It is normally preferred for the primary accelerator to be present at a concentration which is within the range of about 0.2 to about 1.5 phr with it being most preferred for the primary accelerator to be at a concentration of 0.3 to 1 phr. Secondary accelerators will also commonly be utilized in such blends at a concentration which is within the range of about 0.02 to about 0.8 phr. Secondary accelerators are preferably utilized at a concentration of 0.05 to 0.5 phr with the utilization of 0.1 to 0.3 phr of a secondary accelerator being most preferred.

The following examples are presented to further illustrate this invention and the benefits that it provides. These representative examples are merely for the purpose of illustration and are not to be regarded as limiting the scope of the invention or the manner in which it can be practiced. Unless specifically indicated otherwise, all parts and percentages are given by weight.

EXAMPLES 1–4

In this series of experiments, 12× cables were constructed utilizing five core filaments and seven outer filaments. In Examples 1–3, an SPBD monofilament was utilized as a core filament. In Examples 1 and 2, the SPBD had a melting point of 120° C. In Example 3, the SPBD had a melting point of 140° C. In Example 1, the SPBD monofilament had a diameter of 0.3 mm. In Examples 2 and 3, the SPBD monofilament had a diameter of 0.38 mm. The SPBD monofilaments utilized in Examples 1–3 was drawn to a draw ratio of 3:1. Example 4 was carried out as a control without a SPBD monofilament being included in the cable construction.

The cables made in this series of experiments were then embedded in an uncured natural rubber containing two parts of stearic acid, ten parts of zinc oxide, one part of an amine antioxidant, three parts of sulfur, one part of an accelerator and fifty-five parts of carbon black per one hundred parts of the natural rubber. These rubber test specimens were cured at 149° C. (300° F.) for 34 minutes. The steel cords in these test specimens were then subjected to a pull-out test according to ASTM Standard D-2229-73. The results of these pull-out tests which indicate original rubber to metal adhesion are provided in Table I.

A series of the test specimens (cured blocks) were immersed in an aqueous salt solution containing 5% sodium chloride at 32° C. (90° F.) and allowed to remain in the solution for a period of three days. These samples were removed from the salt solution and subjected to the pull-out test. The results of these pull-out tests are reported in Table I as salt-aged adhesion. Another series of test specimens was subject to steam at a temperature of 121° C. (250° F.) for two days. The results of this procedure are reported in Table I as steam aged adhesion. The cables were also evaluated in the three-roll fatigue test. Fatigue testing was done on the original cables and after the salt aging procedure. The results of the fatigue testing are also shown in Table I.

TABLE I

| Example | Rubber Adhesion | | | Fatigue | |
|---|---|---|---|---|---|
| | Original | Salt Aged | Steam Aged | Original | Salt Aged |
| 1 | 108 | 61 | 77 | 23,808 | 22,474 |
| 2 | 102 | 92 | 81 | 19,462 | 17,040 |
| 3 | 108 | 72 | 86 | 16,737 | 13,908 |
| 4* | 100 | 49 | 75 | 17,822 | 11,766 |

*Control

In the three-roll fatigue test, a 55 inch (140 cm) wire cable is placed between 0.12 inch×0.375 inch×21.5 inch (3.0 mm×9.5 mm×54.6 cm) rubber and cured for 20 minutes at 155° C. One end of the cable is secured to the tester and to the other end, after threading through the rollers, a pre-load weight is applied. The weight applied is equal to 10% of the cable breaking strength. The roller diameters are customarily 1 inch, but can also be 0.6 inch (1.5 cm) in diameter. The sample is placed under the first roller over the middle roller and under the third roller. The roller distance center to center is 36.6 mm and the middle roller from the center line of the other two rollers is 12.7 mm when 1 inch (2.54 cm) rollers are utilized. The roller assembly is cycled and imparts almost reverse bending to the composite. Cycles to initial failure are recorded.

The rubber adhesion values shown herein were normalized to that of the control with the original adhesion of the control being 100%. As can be seen, the cables having SPBD dispersed within the interstices thereof exhibited improved original adhesion, salt aged adhesion, steam aged adhesion, original fatigue resistance, and salt aged fatigue resistance. Particularly good fatigue resistance was exhibited by Example 1 which utilized a 0.30 mm SPBD monofilament wherein the SPBD had a melting point of 120° C. This series of examples clearly shows that the fatigue resistance and rubber to metal adhesion of cables can be improved by incorporating SPBD into the interstices thereof.

EXAMPLES 5-6

Example 5 is a 1×0.22+18×0.20+1 cable with the 0.22 mm core filament encapsulated with SPBD having a melting point of 120° C. The filament with the polymer had a diameter of about 0.33 mm. The control cable (Example 6) did not contain polymer.

| Example | Adhesion | | Fatigue | |
|---|---|---|---|---|
| | Original | Salt | Original | Salt |
| 5 | 101 | 70 | 19500 | 11157 |
| 6* | 100 | 46 | 17130 | 14253 |

*Control

Improvements in aged adhesion and original fatigue should be rated. Further, the polymer containing cable core did not migrate as did the control when the cable was subjected to a twisting cyclic motion.

EXAMPLES 7-9

Examples 7 and 8 are 3×0.22+9×0.20+1 cables with their core filaments encapsulated with SPBD having a melting point of 120° C. Example 7 had a thicker polymer layer and an overall diameter of 0.80 mm for the core. Example 8 had a thinner coating of polymer with a 0.50 mm overall core thickness. The control cable (Example 9) did not contain SPBD.

| Example | Adhesion | | | Fatigue | |
|---|---|---|---|---|---|
| | Original | Salt | Steam | Original | Salt |
| 7 | 93 | 69 | 90 | 20637 | 9069 |
| 8 | 93 | 88 | 98 | 22193 | 10062 |
| 9* | 100 | 53 | 87 | 15170 | 12187 |

*Control

Improvement in aged adhesion and original fatigue are realized by incorporating SPBD in the interstices between the filaments. Further such cables can be prepared in one or two steps depending if the encapsulation process is performed during bunching or as a separate process.

The wire of cable coating process is basically an extrusion operation in which either the molten polymer, in the form of tubing, is extruded continuously over axially moving wire or the wire is pulled through the extruded molten polymer.

A typical wire coating unit consists of a pay-off device, extruder equipped with a cross-head die and a take-up device. Wire coating dies are of two general types. With a pressure type die, the wire is coated within the body of the die while the plastic melt is still under pressure.

The capstan controls the speed of the wire as it is drawn through the coating equipment at a constant rate. The winder or takeup unit sole function is to take away the coated wire at a rate consistent to the capstan speed. At the winder, the coated wire traverses the face of the spool to distribute the wire for subsequent processing in the wire cabling procedures.

EXAMPLES 10-12

Example 10 is a 12×0.20+1 cable containing a 0.35 mm SPBD monofilament with a 5.5 draw ratio polymer. Example 11 has 0.32 mm SPBD monofilament made with a 7:1 draw ratio. Example 12 is the control which does not contain SPBD. The SPBD utilized in Example 10 had a melting point of 120° C. and the SPBD employed in Example 11 had a melting point of 90° C.

| | Adhesion | | Fatigue | |
|---|---|---|---|---|
| Example | Original | Salt | Original | Salt |
| 10 | 101 | 99 | 23443 | 17645 |
| 11 | 101 | 97 | 24317 | 18060 |
| 12* | 100 | 50 | 22946 | 13558 |

*Control

Once again, improvements are apparent for the sample containing the SPBD for aged adhesion and fatigue.

While certain representative embodiments and details have been shown for the purpose of illustrating this invention, it will be apparent to those skilled in this art that various changes and modifications can be made without departing from the scope of this invention.

What is claimed is:

1. A process for manufacturing a cable for reinforcing rubber articles which has fatigue and corrosion resistance, said process being comprised of (1) cabling a syndiotactic-1,2-polybutadiene monofilament with a plurality of at least 3 steel filaments into a cable construction having interstices between the steel filaments and (2) subsequently forming a cable by heating the cable construction to a temperature which is above the melting point of the syndiotactic-1,2-polybutadiene for a period of time which is sufficient to allow the syndiotactic-1,2-polybutadiene to melt and disperse throughout the interstices between the steel filaments, wherein the cable has an outer surface and the syndiotactic 1,2-polybutadiene does not protrude out of the interstices between the steel filaments so as to cover the outer surface of the cable.

2. A process as specified in claim 1 wherein the steel filaments are brass coated.

3. A process as specified in claim 2 wherein the syndiotactic-1,2-polybutadiene has a melting point which is within the range of about 90° C. to about 120° C.

* * * * *